A. S. HUBBARD.
ELECTRICAL SYSTEM OF DISTRIBUTION.
APPLICATION FILED JUNE 22, 1907.
987,301.
Patented Mar. 21, 1911.
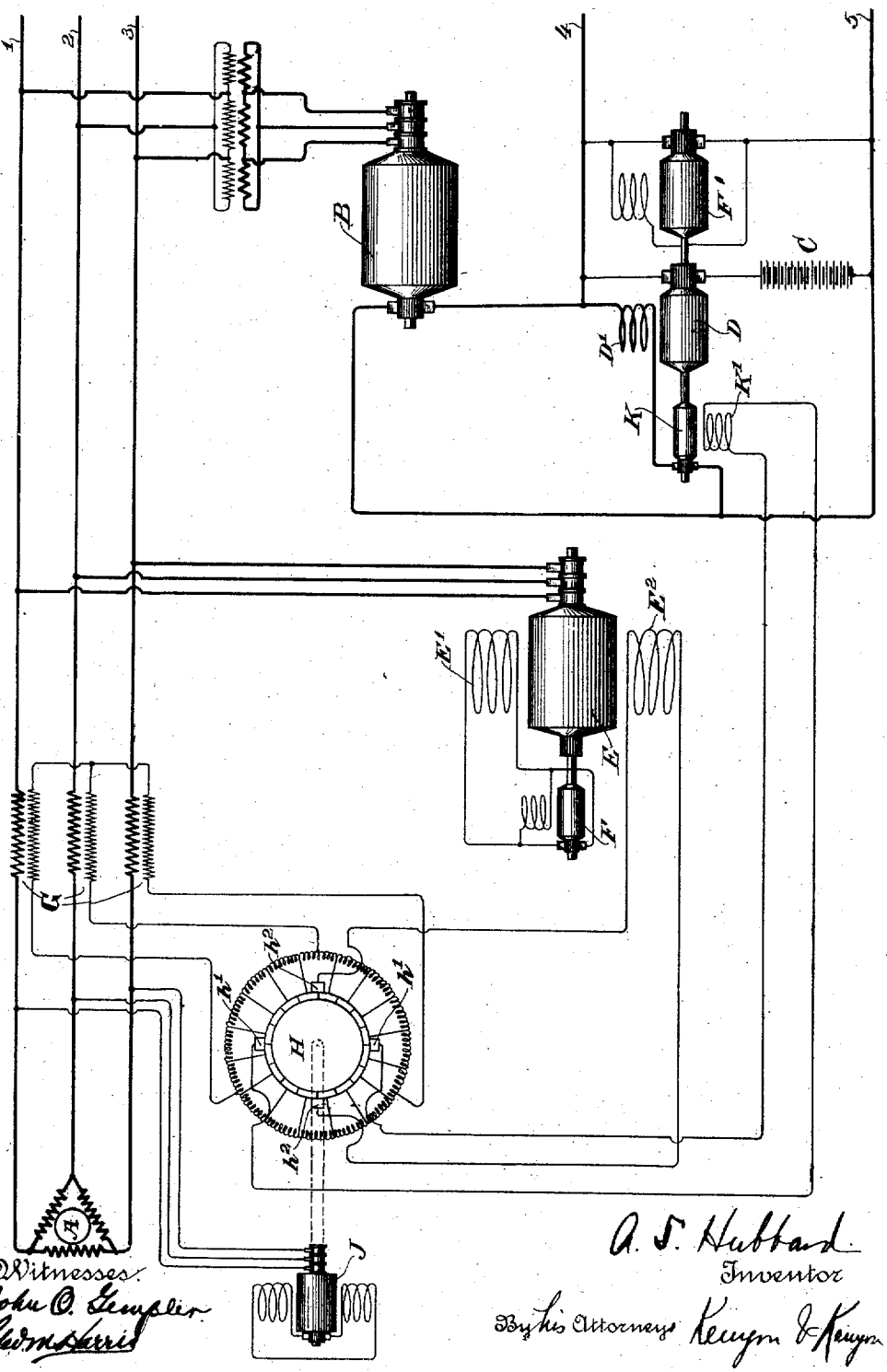

UNITED STATES PATENT OFFICE.

ALBERT S. HUBBARD, OF BELLEVILLE, NEW JERSEY, ASSIGNOR TO GOULD STORAGE BATTERY COMPANY, A CORPORATION OF NEW YORK.

ELECTRICAL SYSTEM OF DISTRIBUTION.

987,301. Specification of Letters Patent. Patented Mar. 21, 1911.

Application filed June 22, 1907. Serial No. 380,212.

*To all whom it may concern:*

Be it known that I, ALBERT S. HUBBARD, a citizen of the United States, and a resident of Belleville, Essex county, State of New Jersey, have invented certain new and useful Improvements in Electrical Systems of Distribution, of which the following is a specification.

My invention relates to electrical systems of distribution in which storage apparatus is arranged in operative relation to alternating current generators to act as a compensating influence to steady the load of the generators. In such systems it is desirable to provide regulating apparatus for controlling the action of the storage apparatus, such regulating apparatus being governed by coils in the alternating current circuit. In practice, however, the regulation of such storage apparatus, specifically storage batteries, by variations of current or load of the alternating current generators is unsatisfactory if the regulation is substantially proportional to the current of the generator of the voltage thereof or the product of the current and voltage. This is due to the fact that in most systems of this character there is no definite relation between the power factor of the circuit and the current or voltage thereof and the actual load on the generator is largely dependent upon the power factor of the circuit, or upon the proportion of the wattless energy to the apparent energy. I find, in practice, that any regulation of such a system having a varying and unpredictable power factor for any given current which involves no compensation for the changes of power factor is extremely unsatisfactory.

By my invention I provide a storage battery constituting storage apparatus and regulate the action of the battery by a booster which is governed by changes of electrical condition of the main generator, while combining with the compensating action of the storage battery the compensating action of a device which acts to give a varying condensance or inductance, this device being connected to the alternating current circuit so that the inductance or condensance varies the power factor of that circuit, the inductance or condensance of this compensator being controlled by the power factor changes of the circuit. Thus if there be a lagging current in the system the power factor compensator is made to act as a condensance and thus reduce the lag in the system. On the other hand, if there be a lead in the system this compensator is made to act as an inductance and so offsets or reduces the lead of the current. The result is that even if the battery is only regulated in its action by apparent load changes, yet the generator may be kept within comparatively close limits of actual load changes because the power factor compensator, acting independently of the battery, prevents any wide variation between the apparent load and the actual load.

The power factor compensator may be a large synchronous motor revolving freely, its field strength being regulated so that its armature, connected to the alternating current system, will act as a condensance when the field strength is great and as an inductance when the field strength is small. I control the field strength of the synchronous motor or power factor compensator by supplying a direct current exciting current that is obtained from a converter connected to the alternating current circuit to receive a current that is responsive to the current changes in the system. This converter is one that has been described and claimed in an application filed by me July 2, 1906, Serial No. 324,393. This is a device having windings and magnetic induction but devoid of motor action, being driven in synchronism with the electro-motive-force of the main generator and having a commutator upon which are two sets of brushes, one set being placed at points of normal (when the power factor is unity) maximum difference of potential, and the other set being placed at the points of normal minimum difference of potential. The current to the converter is supplied by series transformers in the mains of the system. When the power factor varies the two sets of brushes are no longer at the points of maximum and minimum difference of potential so that the current flows in one direction or another from the latter set of brushes, varying in direction according to whether the current of the system is a leading or a lagging one, and varying in degree according to the amount of current in the system and the amount of the lead or lag of said current. The current from this set of brushes varies in accordance with the wattless energy thereof. It is this current that is employed for varying the field of the synchronous motor acting as a power compensator.

In its broader phase my invention comprises the employment of a storage apparatus regulated by current changes in operative relation with an alternating current generator and an independent power factor compensator controlled automatically to limit the power factor variations of the system.

More specifically my invention involves the more specific features above outlined and more fully described hereinafter.

According to my invention I may employ the circuit connected to that set of the brushes of the commutator of the converter which bear upon the points of normal maximum difference of potential either as a by-pass, an adjustable resistance being in the by-pass circuit, or as a source of regulation for the storage battery. In the latter case the battery will be regulated responsively not merely to current or apparent load variations of the alternating current load of the generator, but in definite relation to the true energy changes thereof. In this case the independent power factor compensator regulated by the other circuit from the converter will, as before, limit power factor changes on the system while the storage battery will be regulated to compensate for such changes of power factor as still exist.

Where the translating devices and the generators are considerable distance apart it is preferable to connect the power factor compensator and its regulating apparatus at the part of the system to which the translating devices are connected, while the compensating battery and its regulating apparatus may be placed at any convenient point, either at the main generating station or at the end of the transmission line.

My invention makes possible the employment of a main generator station of the compensating storage apparatus and of independent power factor compensators at various parts of the system.

My invention involves the foregoing features and also the more specific features of construction and arrangement and combination which will be more fully described hereinafter.

The drawing is a diagram illustrating a system of distribution to which one specific embodiment of my invention is applied.

A represents a main alternating current generator shown as a three phase generator. This may be considered indicative of one or any number of generators and it is immaterial whether this generator is in the main station of the system or a sub-station and whether it is a prime source of electricity of what character of source it may be so long as it supplies to the system or to a part of the whole system an alternating current for some commercial purpose.

B is a rectifier connected to the alternating current circuit of the generator A and to a direct current circuit and serving as a means for transferring energy from either circuit to the other.

C is a storage battery in which part of the energy of the generator A is to be stored during period of light load and which is to give out energy to the translating devices during periods of heavy load. The translating devices may be connected either to the alternating current conductors 1, 2, 3, or to the direct current conductors 4, 5, or to both. The system may be such, if the translating devices are largely or wholly connected to the direct current side, that energy will never be transferred from the battery to the alternating current side of the system, or it may be such that during times of battery discharge the current from the battery, or a part of it, will be transferred into the rectifier B and supply energy to the alternating current translating devices.

D is a booster in series with the battery C and regulated from intervening apparatus responsively to electrical conditions of the alternating current circuit.

E is the power factor compensator being in the present instance a large synchronous motor having a field winding E′ constantly excited from the exciter F and a second or regulating field winding $E^2$, the current in which is to be regulated by intervening apparatus in definite relation to the power factor changes of the system.

The power factor compensator E and the storage battery C are in operative relation with the alternating current circuit, the former being connected directly thereto and the latter because it is connected to the converter or rectifier B.

F′ is a motor to drive the booster D.

I have illustrated in the drawing the battery and compensator as being regulated by the variations occurring at the same point in the system, such regulation being effected in part by the same apparatus, but such apparatus acts to produce the different regulating effects upon the battery and compensator that my invention involves.

G, G, G, are series transformers in the circuit of the main generator A so that the current given out by the secondaries of these tranformers (which in the present instance are indicated as star connected) will vary in accordance with the current variations of the main generator.

H is a rectifier or converter which, as indicated, is provided with windings and a commutator, the three secondaries of transformers G being connected to the windings at points 120° apart. This rectifier will have magnetic induction and is preferably constructed with magnetic material, but it is devoid of motor or generator action, which is attained in the present instance by having no external field magnet. Such a rectifier has been shown and described more in detail in the patent to Edward Van Wagenen, 869,279, October 29th 1907. The rectifier H is mechanically connected, as indicated, with a synchronous motor J which, to obtain the best result, should be constructed to operate in close synchronism with the generator. The converter H is therefore driven in synchronism with the electro-motive-force of the alternating current circuit. The current supplied from transformers G to the winding of converter H produces a rotating field which rotates in synchronism with the current of the alternating current circuit. When the electro-motive-force and current of the alternating current circuit are in phase, the rotating field will be stationary in space at a definite position, whereas the position of this rotating field will vary whenever the phase relation of the electro-motive-force and current vary.

$h'$ are brushes bearing upon the commutator $h$ of the converter H at points of substantially maximum difference of potential when the current and electro-motive-force of the alternating current circuit are in phase, i. e., when the power factor is unity.

$h^2$ are brushes bearing upon commutator $h$ at points substantially 90 electrical degrees from brushes $h'$ and therefore at points of substantially equal potential when the power factor is unity. When, therefore, the power factor of the alternating current circuit is unity, the current in any circuit connected to brushes $h'$ will be in a given proportion to the current in the alternating current circuit, while the current in any circuit connected to brushes $h^2$ will be zero. If, however, there is a leading current in the alternating current circuit, the brushes $h'$ will no longer be at the points of maximum difference of potential, nor will the brushes $h^2$ be at points of substantially equal potential. For this reason a current in the circuit of brushes $h'$ will be smaller relatively to that of the alternating current circuit than when the power factor is unity, while a current whose strength, relative to that of the alternating current circuit, will depend upon the extent of lead, will flow in the circuit of the brushes $h^2$. When there is a lag of the current in the alternating current circuit, the same results are produced except that the current in the circuit of the brushes $h^2$ will be in the opposite direction.

It will be seen that the current in the circuit of the brushes $h'$ will vary in proportion to the true energy components of the apparent energy, while the current in the circuit of the brushes $h^2$ will vary in accordance with variations of the wattless energy components of the apparent energy. In the specific system shown, I have employed the current produced in the circuit of the brushes $h'$ as a regulating current for the battery, whereby the battery action is regulated in accordance with changes of true energy components of the apparent energy of the alternating current circuit, while I have used the current in the circuit of the brushes $h^2$ as a regulating current for the power factor compensator so that it may be regulated in accordance with the wattless energy changes of the circuit and thereby limit the variations of power factor in that circuit.

The regulation of the battery action is effected by the variations of current in the circuit of brushes $h'$ by causing such current to circulate in field coil K' of a counter machine K, mechanically connected to the booster D and motor F', which counter machine is in circuit with the field coil D' of the booster, the two being connected in a local circuit across the direct current side of the system. Assuming that the apparatus is adjusted so that for the average actual load upon the main generator A, the voltage of booster D will be zero and the battery will be floating across the direct current side of the system neither charging nor discharging, then at this average condition of the main generator the current in the coil K' will be such as to produce an electro-motive-force in the counter machine K that will equal the opposing electro-motive-force of the direct current side of the system. If by a change of current from the main generator, or by a change in the power factor, or by both combined, the actual load (assuming unchanged voltage of the main generator) becomes changed, then there will be a corresponding change in the current of the field K' and a definitely related change in the current of the field D' of the booster, thus causing the booster to produce an electro-motive-force that will assist to charge or discharge the battery according to whether the change in the actual load on the main generator was a decrease or an increase. Changes of the wattless energy of the circuit of the generator A are without substantial effect upon the control of the booster because that part of the apparent energy which corresponds to the wattless energy of the circuit causes a part of the current from the transformers G to be by-passed to the circuit connected with the brushes $h^2$.

The current from the brushes $h^2$ supplies the regulating field winding $E^2$ of the synchronous motor or puower factor compensator E. When the power factor is unity so that there is no current in the field winding $E^2$, the field winding E' will give a field strength to the motor E that will cause such motor to act neither as an inductance nor as a condensance. When, however, there is a leading current, the current in the circuit of the brushes $h^2$ is in such direction as to cause the coil $E^2$ to be a differential coil, thus weakening the field strength of the synchronous motor and causing it to act as an inductance to oppose the condensance of the remaining portion of the system and lessen the lead. On the other hand, if the current in the alternating current circuit be a lagging one, the coils $E'$ and $E^2$ act cumulatively and cause the synchronous motor to act as a condensance to oppose the inductance of the other portions of the alternating current circuit and reduce the lag therein. By the system illustrated therefore the battery and power factor compensator are independently regulated, the former being regulated to maintain a substantially constant real load upon the main generator, while the latter is regulated to steady the power factor of the circuit of the main generator and thus avoid large wattless energy currents.

Many specific methods and apparatus have been provided to regulate storage batteries either for alternating current or for direct current generators and it is not material to this invention what particular method or apparatus is employed for this purpose. Moreover, it is not important to my invention whether such regulation as is given to the battery is a regulation by current changes or energy changes or voltage changes, such matters being variations that depend upon the particular conditions to be met, as well as being matters of engineering choice and all coming within my invention be in the opposite direction.

Having thus described my invention what I claim as new and desire to secure by Letters Patent is,—

1. In an electrical system of distribution an alternating current circuit, a power factor compensator therefor, a storage apparatus operatively connected with the circuit and an electric device excited by currents responsive to changes in the electrical condition of the circuit, said device being arranged and having connections to produce two currents, one for the regulation of the power factor compensator and the other for the regulation of the storage apparatus.

2. The combination of an alternating current circuit, a power factor compensator therefor, a storage apparatus operatively related to the circuit and an electric machine operating responsive to changes in the electrical condition of said circuit having connections and arranged to regulate both the compensator and storage apparatus.

3. The combination of an alternating current circuit, a power factor compensator therefor, a storage apparatus operatively related to the circuit and a synchronously driven electric machine carrying current responsive to current changes of the system and arranged to produce currents which regulate the compensator and storage apparatus.

4. The combination of an alternating current circuit, a power factor compensator therefor, a storage apparatus operatively related to the circuit and a device operatively related to the circuit and arranged to produce a current responsive to wattless energy changes of the circuit for regulating the compensator, and a current responsive to true energy changes of the circuit for regulating the storage apparatus.

5. The combination of an alternating current circuit, a power factor compensator therefor, a storage apparatus operatively related to the circuit, means operatively related to the alternating current circuit and arranged to produce a current responsive to variations of the wattless energy of the circuit and a current responsive to true energy variations of the circuit and means arranged whereby the storage apparatus is regulated by one of said currents and the power factor compensator by the other of said currents.

6. The combination of an alternating current circuit, a power factor compensator therefor, a storage apparatus operatively related to the circuit, means operatively related to the alternating current circuit and arranged to produce a current responsive to variations of the wattless energy of the circuit and a current responsive to true energy variations of the circuit, a controlling coil on the compensator energized by said first mentioned current and a coil excited by said second mentioned current and arranged to regulate the storage apparatus.

7. The combination of an alternating current circuit, a power factor compensator therefor, a storage apparatus operatively related to the circuit, a rectifier connected to receive alternating current varying with that of the alternating current circuit arranged to produce a rotary magnetic field driven in synchronism with the electromotive force of the alternating current circuit, a commutator on the rectifier, a pair of brushes on the commutator normally at points of substantially equal potential, a pair of brushes on the commutator normally at points of maximum difference of potential, a coil connected to said first mentioned brushes and arranged to regulate the compensator and a coil connected to the last mentioned brushes and arranged to regulate the storage apparatus.

8. The combination of an alternating current circuit, a power factor compensator therefor, a storage battery operatively related to the circuit, a rectifier connected to receive alternating current varying with that of the alternating current circuit, a commutator on the rectifier, a pair of brushes on the commutator normally at points of substantially equal potential, a pair of brushes on the commutator normally at points of maximum difference of potential, and a coil connected to each pair of brushes, one of said coils being arranged to control the action of the power factor compensator and the other coil being arranged to control the action of the battery.

9. The combination of an alternating current circuit, a power factor compensator and a storage battery in operative relation thereto, an electric apparatus having windings energized by current responsive to current changes of the circuit and brushes rotated relatively to said windings in synchronism with the voltage of the circuit, said apparatus being arranged to produce two currents and means arranged whereby one of the currents regulates the action of the storage battery and the other of said currents regulates the action of the compensator.

10. The combination of an alternating current circuit, means for producing a condensance arranged to regulate the circuit for power factor changes thereof, a compensatory storage battery in operative relation to the circuit, an electric apparatus having windings energized by current responsive to current changes of the circuit and brushes rotated relatively to said windings in synchronism with the voltage of the circuit, said apparatus being arranged to produce two direct currents, one responsive to wattless energy changes of the circuit and the other responsive to true energy changes of the circuit, and means whereby said first mentioned current regulates the action of said means for producing the condensance and said second mentioned current regulates the action of the battery.

11. The combination of an alternating current circuit, series transformers operatively arranged with respect thereto, a power factor compensator and compensatory storage battery in operative relation thereto, and a rectifier excited by current from transformers connected in series in said circuit, said rectifier having a part rotatable in synchronism with the voltage of the circuit and said rectifier being arranged to produce currents for regulating both the power factor compensator and the storage battery.

12. The combination of an alternating current circuit, a power factor compensator operatively related thereto and arranged to maintain the power factor of the circuit at substantially unity and a storage apparatus operatively related to the circuit and means for regulating the storage apparatus responsive to current changes of the circuit, said means including an apparatus for producing a current responsive to true energy changes of the circuit with varying power factor whereby the battery is regulated by substantially true energy changes of the circuit.

13. The combination of an alternating current circuit, a power factor compensator therefor, a storage apparatus operatively related to the circuit, means operatively related to the alternating current circuit and arranged to produce two currents, one responsive to current changes of the current of the circuit, and means whereby the storage apparatus is regulated by this last mentioned current and means whereby the compensator is regulated by the other current.

14. The combination of an alternating current circuit, a power factor compensator therefor, a storage apparatus operatively related to the circuit, apparatus operatively related to the alternating current circuit and arranged to produce two currents, one responsive to current changes of the current of the circuit, and the other responsive to power factor changes of the circuit, means whereby the storage apparatus is regulated by said first mentioned current and means whereby said compensator is regulated by said last mentioned current so that the battery is substantially regulated by true energy changes of the circuit.

In testimony whereof, I have signed my name to this specification, in the presence of two subscribing witnesses.

ALBERT S. HUBBARD.

Witnesses:
EDWIN SEGER,
ANNA DALY.

Copies of this patent may be obtained for five cents each, by addressing the "Commissioner of Patents, Washington, D. C."